(12) United States Patent
Wehrle

(10) Patent No.: US 7,166,947 B2
(45) Date of Patent: Jan. 23, 2007

(54) PERMANENTLY EXCITED ELECTRICAL MACHINE

(75) Inventor: Andreas Wehrle, Durbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/528,971

(22) PCT Filed: Oct. 13, 2003

(86) PCT No.: PCT/DE03/03393

§ 371 (c)(1),
(2), (4) Date: Mar. 23, 2005

(87) PCT Pub. No.: WO2004/070916

PCT Pub. Date: Aug. 19, 2004

(65) Prior Publication Data

US 2006/0145554 A1   Jul. 6, 2006

(30) Foreign Application Priority Data

Jan. 23, 2003   (DE) ................. 103 02 454

(51) Int. Cl.
*H02K 21/26* (2006.01)
(52) U.S. Cl. ............................... 310/154.12
(58) Field of Classification Search ......... 310/154.12–154.49, 89, 91; *H02K 1/17*
See application file for complete search history.

(56) References Cited

U.S. PATENT DOCUMENTS

| | | | |
|---|---|---|---|
| 4,873,461 A | | 10/1989 | Brennan et al. |
| 5,105,114 A | * | 4/1992 | Sickle et al. ............ 310/154.13 |
| 5,679,994 A | * | 10/1997 | Shiga et al. ............ 310/154.12 |

FOREIGN PATENT DOCUMENTS

| | | |
|---|---|---|
| DE | 1 160 080 | 12/1963 |
| DE | 101 52 502 A1 | 5/2003 |
| GB | 1 018 660 | 1/1966 |
| JP | 61-10950 | 1/1986 |
| JP | 2001-231189 | 8/2001 |

* cited by examiner

*Primary Examiner*—Darren Schuberg
*Assistant Examiner*—Nguyen Hanh
(74) *Attorney, Agent, or Firm*—Michael J. Striker

(57) ABSTRACT

An electrical machine, in particular a direct current motor for vehicles, has a multi-pole stator which has an annular pole housing (1) and a plurality of magnets (2) that are located on the inside face of the pole housing (1). The electrical machine further includes a magnet splinter guard (3), which shields the magnets (2) inward in the radial direction toward the rotor, in which the magnet splinter guard (3) is formed from a rectangular blank, has an overlapping region (4), extending in the circumferential direction over the axial length of the magnet splinter guard (3). On each of the ends (6, 7) of the magnet splinter guard (3) located in the axial direction, a respective centering ring (8) is located, for centering the magnet splinter guard (3).

9 Claims, 2 Drawing Sheets

PERMANENTLY EXCITED ELECTRICAL MACHINE

CROSS-REFERENCE

The invention described and claimed herein below is also described in PCT/DE 03/03393, filed on Oct. 13, 2003 and DE 103 02 454.9, filed Jan. 23, 2003. This German Patent Application, whose subject matter is incorporated here by reference, provides the basis for a claim of priority of invention under 35 U.S.C. 119(a)–(d).

BACKGROUND OF THE INVENTION

The present invention relates to a permanently excited electrical machine, in particular a direct current motor for vehicles.

From German Patent Disclosure DE 1160080 A1, a direct current motor is known in which the stator poles are formed of rectangular permanent magnets and pole shoes mounted on the permanent magnets. The permanent magnets are secured to a pole housing by means of adhesive bonding. The working air gap between the stator and rotor is defined by the pole shoes.

In the known direct current machines, for various reasons, such as a rough operating environment of a vehicle, material stresses in the permanent magnet cannot reliably be prevented from causing cracks and discontinuities, which can cause small splinters or pieces of material to become detached from the permanent magnet. If such material splinters get into the working air gap, this can cause seizing or blocking of the rotor. This is critical, especially if the motor is used for power-assisted steering in vehicles. It has therefore been proposed that a cylindrical magnet splinter guard be provided between the magnets of the stator and the rotor, the magnet splinter guard being retained on the stator by means of two covering rings.

SUMMARY OF THE INVENTION

The electrical machine of the invention has the advantage over the prior art that has an inexpensive magnet splinter guard that is simple to produce. The magnet splinter guard is formed of a rectangular blank and has an overlapping region extending over the axial length of the splinter guard. The result is a magnet splinter guard that is simple to produce and that prevents pieces of material that splinter off from the magnet from getting into the working air gap between the stator and the rotor. The overlap assures that splintered-off pieces cannot get in between the two layers of the overlapping region to reach the working air gap. According to the invention, centering rings are also provided, which are located on both ends, in the axial direction, of the magnet splinter guard. As a result, centering of the magnet splinter guard can be made possible, so that a working air gap that is constant over the length and is as narrow as possible is preserved. Thus the electrical machine of the invention can be used especially in vehicles, for instance in steering gears for power-assisted steering or as an electric motor for introducing braking force, in which high functional safety must be assured in order to prevent a vehicle from becoming unsteerable. In particular, the overload couplings presently used for preventing such an unsteerable situation of the vehicle can be dispensed with.

By the provisions recited in the further claims, advantageous refinements of or improvements to the electrical machine of the invention are possible.

Especially preferably, the magnet splinter guard is embodied such that in the installed state, it automatically presses radially outward against the magnets and thus stays in position by its intrinsic elasticity, without further aids. The centering rings act as an additional safety device.

To enable fast, simple centering that is automatically maintained upon installation, the centering rings each have a tapering region.

Also preferably, the centering rings enclose the magnets between the pole housing and the magnet splinter guard, so that there is no possibility for magnet splinters to escape from this closed space.

To furnish improved magnetic flux, the magnets preferably have pole lifts. The overlapping region of the magnet splinter guard is especially preferably located on these pole lifts.

Also preferably, a clamping strip is located on the outer circumference of the magnet splinter guard, to attain a fastening of the magnet splinter guard by clamping of the clamping strip between two adjacent magnets. The clamping strip also secures the magnet splinter guard against twisting.

To make especially simple installation possible, the axial ends of the magnet splinter guard are preferably bent slightly radially outward.

The overlapping region of the magnet splinter guard is also preferably formed such that a radially outward-oriented graduation is embodied at the overlapping region. As a result, the overlap can be designed such that the magnet splinter guard has a constant inside diameter, so that the air gap between the stator and the rotor is constant.

In order, with maximum certainty, to prevent unintentional loosening, the overlapping region of the magnet splinter guard is preferably connected in captive fashion. This can be accomplished for instance by means of gluing or welding or by interlocking of the overlapping regions, or the like.

Preferably, the tapering region of the centering rings is embodied as a cone or as an outward-bulging region, or as an inward-bulging region, or as a stepped tapering region.

BRIEF DESCRIPTION OF THE DRAWINGS

The invention is explained in further detail in the ensuing description in terms of an exemplary embodiment shown in the drawing. Shown are.

DETAILED DESCRIPTION OF THE EXEMPLARY EMBODIMENTS

Figure 1:
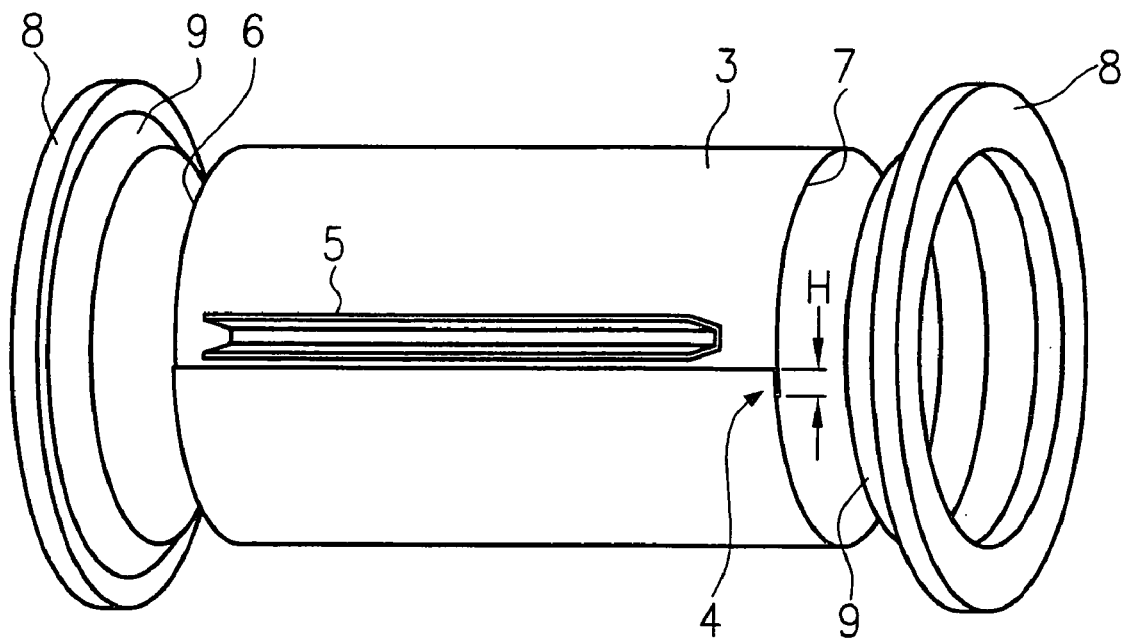
FIG. 1, a schematic perspective view of a magnet splinter guard in a first exemplary embodiment of the present invention.
Figure 2:
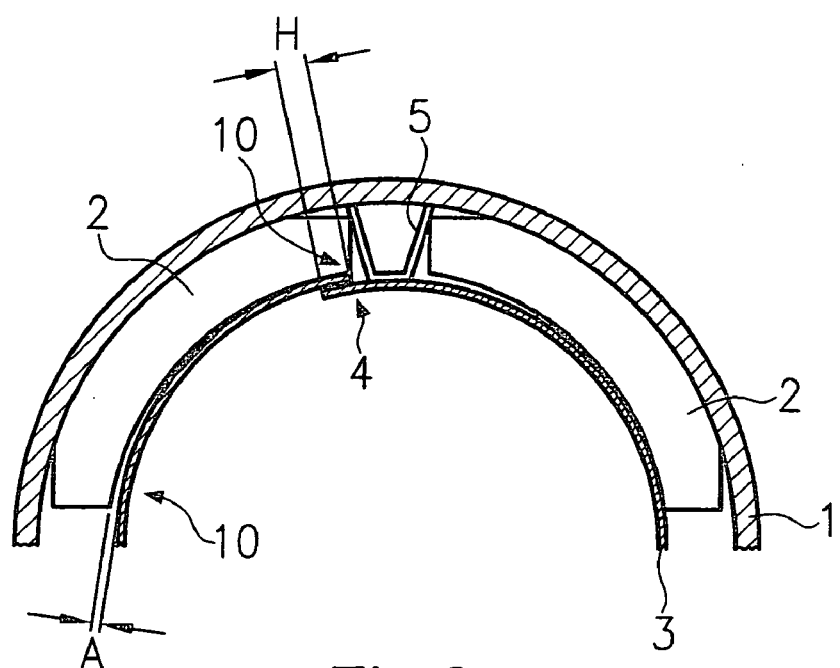
FIG. 2, a schematic sectional view of the magnet splinter guard shown in FIG. 1.

In FIGS. 1 and 2, a magnet splinter guard 3 is shown in a first exemplary embodiment of the present invention. As can be seen particularly from FIG. 1, the magnet splinter guard 3 is embodied substantially cylindrically, and on its outer circumference it has a clamping strip 5. The magnet splinter guard 3 is made from a rectangular blank and has an overlapping region 4, which is embodied in overlapping or covering fashion in the circumference direction of the magnet splinter guard 3 and extends over the entire axial length of the magnet splinter guard 3. The overlapping region 4 has a predetermined overlapping height H, so that over a certain circumferential length a contact of the two butt ends of the magnet splinter guard can be attained.

In the installed state shown in FIG. 2, the clamping strip 5 of the magnet splinter guard 3 is located between two permanent magnets 2, 2. The clamping strip 5 is embodied with a V-shaped cross section, and it clamps between the two magnets, to keep the magnet splinter guard in position. The clamping strip 5 also serves as a twist preventer to prevent twisting of the magnet splinter guard. As a result, the overlapping region 4 of the magnet splinter guard 3 can be located on a pole lift 10 of the permanent magnet 2, where the thickness of the permanent magnet 2 decreases continuously down to a predetermined amount A (see FIG. 2). Thus the overlapping region 4 is located radially outside the diameter of the magnet splinter guard, and a constant inside diameter of the magnet splinter guard 3 can be attained. This assures that the air gap between the stator and the rotor, not shown, of the electrical machine will remain constant, or can be reduce, with an increase in power, in comparison to the prior art.

For centering the magnet splinter guard 3, the cylindrical magnet splinter guard is centered by means of two centering rings 8, which are each located on respective ends 6, 7, located in the axial direction, of the magnet splinter guard 3 (see FIG. 1). The centering rings 8 have a tapering region 9, which centers the magnet splinter guard from its inside during installation. It is also possible for the magnet splinter guard to be embodied as spread slightly open, so that an additional holding function can be exerted by the centering rings 8. However, this spreading open must extend only so far that there is still a constant coverage in the overlapping region 4, so that any magnet splinters that might have splintered off can be prevented with certainty from reaching the air space between the stator and the rotor. It should also be noted that the magnet splinter guard 3 is embodied such that in the installed state, it automatically exerts an axially outward-oriented spreading-open force, so that it presses closely against the magnets 2.

Thus by means of the magnet splinter guard of the invention, it can be assured that no splintered-off particles can get into the air gap between the stator and the rotor, where in an extreme case they would cause blocking of the electrical machine. The magnet splinter guard 3 is very simple in construction and can be produced economically and also installed simply.

Figure 3:
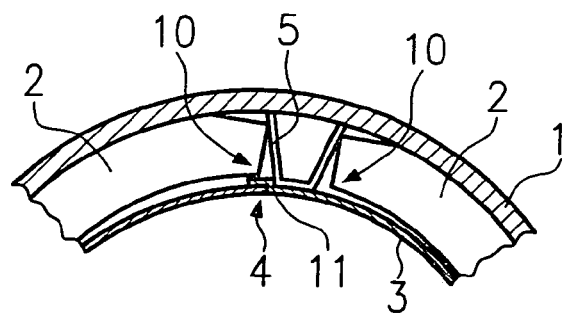
FIG. 3, a schematic sectional view of a magnet splinter guard in a second exemplary embodiment of the present invention.
Figure 4:
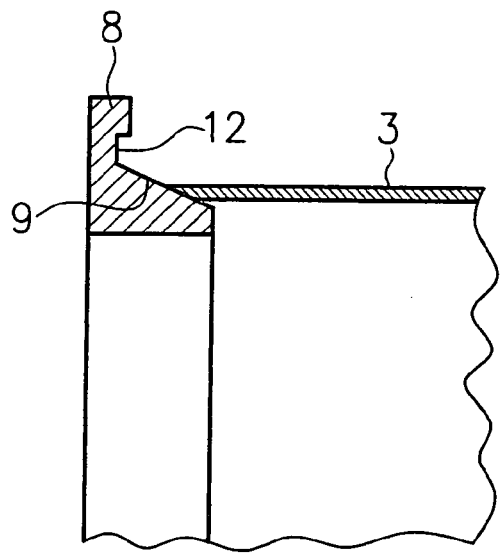
FIGS. 4 through 7, schematic sectional views of various embodiments of centering rings according to the invention.
Figure 5:
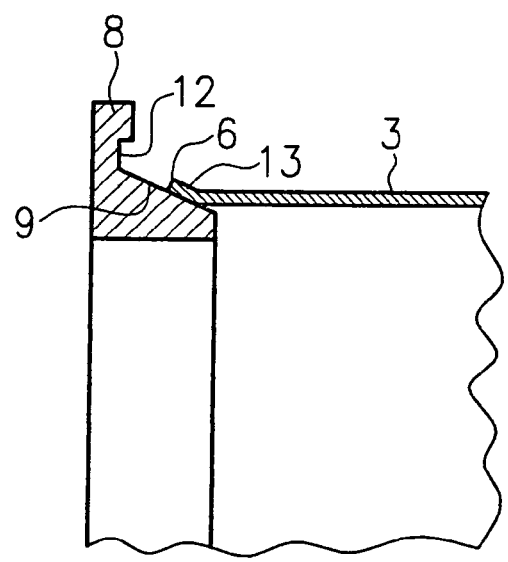
Figure 6:
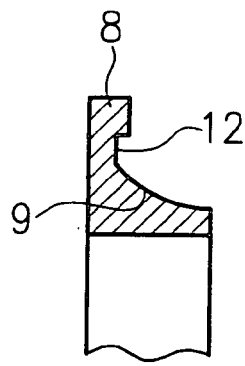
Figure 7:
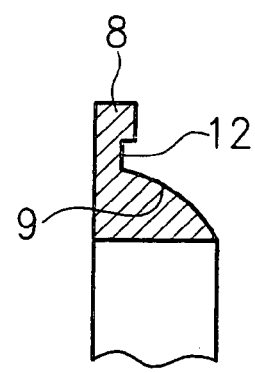

FIG. 3 shows a magnet splinter guard in a second exemplary embodiment of the present invention. Unlike the first exemplary embodiment, in this further exemplary embodiment, a graduated region 11 is embodied on the overlapping region 4, so that the inner part of the overlapping region can press directly against the step of the graduated region 11. A constant inside diameter of the magnet splinter guard 3 is thus attained, so that the small offset at the overlapping region that exists in the first exemplary embodiment is eliminated. To have enough space in the radial direction outward, the overlapping region 4 is located on the pole lift 10 of the magnet 2 where the thickness of the magnet is reduced continuously down to the amount A (see FIG. 2). Otherwise, this exemplary embodiment is equivalent to the first exemplary embodiment, so that the description of the latter may be referred to.

In FIGS. 4 through 7, various possible embodiments of the centering rings 8 are shown. In the exemplary embodiment shown in FIG. 4, the tapering region 9 is embodied as a cone. A recess 12 is also embodied on the cylindrical ring 8, in which the magnet splinter guard 3 or more precisely an axial end of the magnet splinter guard is located in its final installed position. Slight clamping in the recess 12 may be provided to make it possible to establish a secure connection between the magnet splinter guard 3 and the centering rings 8. In the exemplary embodiment shown in FIG. 5, the tapering region is also embodied conically, but on the end 6 of the magnet splinter guard 3, a radially outward-oriented region 13 is embodied, making easy installation possible. The exemplary embodiment in FIG. 6 has a tapering region 9 which is embodied as an inward-bulging region, and the exemplary embodiment shown in FIG. 7 has a tapering region 9 which is embodied as an outward-bulging region.

A further advantage of the invention is that besides the centering by means of the centering rings 8, any production variations that may exist can also be compensated for. Moreover, in the installed state, the centering rings 8 can completely close off the space in which the magnets 2 are disposed, so that there is no possibility of magnet splinters penetrating to the outside.

Moreover, the overlapping region 4 also offers the possibility of compensating for temperature changes that occur during operation, since the magnet splinter guard 3, because of the overlapping region 4, can be spread apart to a certain extent in the circumferential direction, without lessening the protective function. Nevertheless, a constant air gap between the stator and the rotor can be maintained.

The invention claimed is:

1. An electrical machine, in particular a direct current motor for vehicles, comprising: a multi-pole stator having an annular pole housing (1) and a plurality of magnets (2) that are located on an inside face of the pole housing (1); and a magnet splinter guard (3), wherein said magnet splinter guard (3) shields the magnets (2) inward in the radial direction toward a rotor, wherein the magnet splinter guard (3) is formed from a rectangular blank, has an overlapping region (4), extending in the circumferential direction over an axial length of the magnet splinter guard (3), and on each end (6, 7) of the magnet splinter guard (3) located in the axial direction, a respective centering ring (8) is located, for centering the magnet splinter guard (3), wherein the magnets (2) have pole lift (10), and the overlapping region (4) of the magnet splinter guard (3) is located on the pole lift (10).

2. The electrical machine according to claim 1, wherein the magnet splinter guard (3), in the installed state, automatically exerts a radially outward-oriented prestressing force on the magnets (2).

3. The electrical machine according to claim 1, wherein the centering rings (8) each have a tapering region (19).

4. The electrical machine according to claim 1, wherein the centering rings (8) enclose the magnets (2) between the pole housing (1) and the magnet splinter guard (3).

5. The electrical machine according to claim 1, further comprising a clamping strip (5), wherein the clamping strip (5) is located on the outer circumference of the magnet splinter guard (3) and in the installed state is located between two magnets (2).

6. The electrical machine according to claim 1, wherein the axial ends (6, 7) of the magnet splinter guard (3) are slightly bent radially outward.

7. The electrical machine according to claim 1, wherein the magnet splinter guard (3) at the overlapping region (4)

has a graduated region (11), so that the magnet splinter guard (3) in the installed state has a constant Inside diameter.

8. The electrical machine according to claim 1, wherein the magnet splinter guard (3) is joined to the overlapping region (4) in captive fashion.

9. The electrical machine according to claim 1, wherein the tapering region (9) of the centering rings (8) is embodied as a cone or as an outward-bulging region, or as an inward-bulging region, or as a stepped tapering region.

* * * * *